March 4, 1969     H. REHRIG     3,430,807

MATERIAL HANDLING CRATE

Original Filed July 10, 1967

INVENTOR

HOUSTIN REHRIG

BY Browne, Schuyler & Beveridge

ATTORNEYS

United States Patent Office 3,430,807
Patented Mar. 4, 1969

3,430,807
MATERIAL HANDLING CRATE
Houston Rehrig, Pasadena, Calif., assignor to Rehrig Pacific Company, Los Angeles, Calif., a corporation of California
Continuation of application Ser. No. 652,264, July 10, 1967. This application May 23, 1968, Ser. No. 733,740
U.S. Cl. 220—97  16 Claims
Int. Cl. B65d 21/02, 15/24, 19/06

ABSTRACT OF THE DISCLOSURE

A material handling crate having the bottom panel and the side panels formed from dissimilar materials. Either the bottom panel or the side panels may be formed from a plurality of rod-like metallic members and the other molded from synthetic resin material with an improved means of securing the bottom panel to the side panels.

---

This application is a continuation of Ser. No. 652,264, filed July 10, 1967, now abandoned.

This invention relates to material handling crates, and more particularly to an improved material handling crate having bottom and side portions constructed of different materials.

Various materials have, in the past, been employed to construct material handling crates of the type used, for example, by the dairy industry for handling a plurality of bottles or cartons of milk, or by the agricultural industry for handling fruits and vegetables. Common among such crates, and particularly those used in the dairy industry, is the wire frame crate fabricated from metallic rod stock material. One such crate is illustrated, for example, in Rehrig Patent No. 2,974,818. More recently, material handling crates of this general type have been formed by injection molding the bottom and side panels of the crate, as a unit, from a single homogenous mass of plastic material such as polyethylene or other synthetic resin material referred to hereinafter generally as plastic. Such a crate is illustrated, for example, in the copending United States patent application Ser. No. 417,715, now Patent No. 3,341,060, assigned to the assignee of the present invention.

Both the wire frame and the molded plastic structures have certain advantages for particular uses, and the present invention is directed toward utilizing the particular advantages of the separate structures in a single crate. This is accomplished by forming portions of the crate from separate materials, and then joining the separately formed portions to form a rigid crate structure.

Accordingly, a primary object of the present invention is to provide an improved material handling crate in which the bottom panel and the side panels of the crate are formed from dissimilar materials.

Another object of the invention is to provide such a material handling crate in which the bottom and the side panels are separately formed, and subsequently assembled into a rigid unitary crate structure.

Another object of the invention is to provide a material handling crate having an improved means for securing the bottom panels to the side panels of the crate.

The foregoing and other objects of the invention are attained in a material handling crate in which the bottom panel portion is injection molded from a synthetic resin material, with an integrally molded stacking ring formed on the lower surface of the bottom panel adjacent the outer periphery thereof. An upwardly directed channel is formed in the bottom surface of the stacking ring, and an elongated metallic insert is positioned within the channel. A plurality of apertures are formed in the upper surface of the bottom panel at spaced intervals along the stacking ring, and extend into the bottom panel to communicate with the channel in the stacking ring.

The upwardly extending side panel portion of the crate is formed from elongated metallic rod members, and includes a number of laterally extending lugs positioned to project, one within each of the apertures in the bottom panel. These lugs are resistance welded to the metallic insert in the channel to thereby rigidly assemble the wire frame body portion of the crate to the molded plastic bottom panel.

Other objects and advantages of the invention will become apparent from the following detailed description, taken with the drawings, in which.

Figure 1:
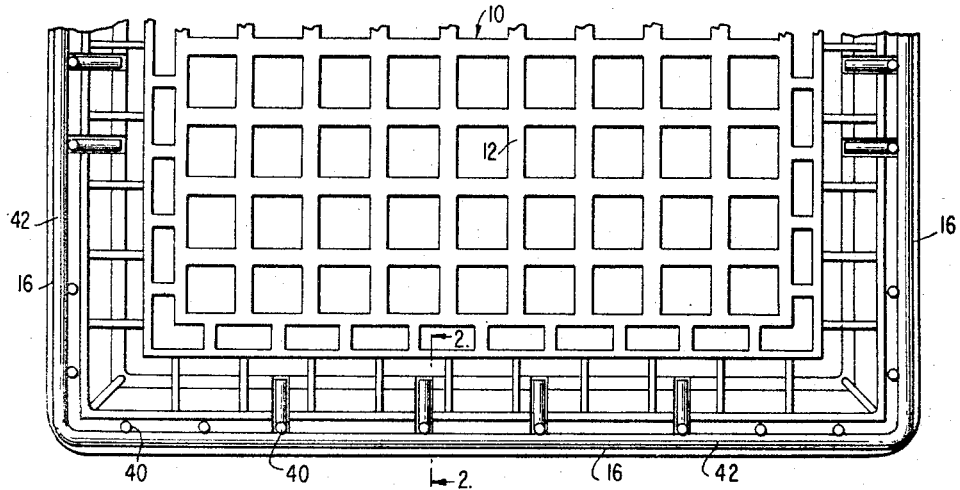
FIG. 1 is a fragmentary top plan view of a generally rectangular material handling crate according to the present invention and including a molded plastic bottom panel portion and a wire frame body portion.

Referring first to the embodiment of the invention illustrated in FIGS. 1–4 of the drawings, a portion of a generally rectangular material handling crate embodying the invention, indicated generally by the reference 10, includes a molded plastic bottom panel portion 12 and an upwardly extending wire frame body portion 14. The body portion 14 includes generally perpendicularly arranged side panels 16, each made up of a plurality of rod-like metallic members arranged in an open grid similar to that illustrated in the above-mentioned United States Patent No. 2,974,818. The side panels 16 are rigidly connected at their side edges to define the corners of the rectangular crate 10.

The molded plastic bottom panel 12 may be of any desired configuration. However, for crates employed to handle relatively heavy or easily damaged loads, the bottom is preferably of an open grid construction illustrated in FIGS. 1 and 2, as this construction provides a very high strength-to-weight ratio for he molded plastic. Further, this open grid construction requires a minimum curing time for a structure having the desired strength characteristics, so that the mold time is thereby substantially reduced over that required by other constructions.

The bottom panel 12 includes an integrally molded ledge, or stacking ring 18 formed on the bottom of and projecting below the lower surface of the panel. An upwardly directed channel 20 is formed in and exends upwardly from the bottom surface 22 of the stacking ring to form, in effect, a pair of spaced, generally parallel flanges 24, 26 integrally joined at their upper edges by a web portion 28, thereby giving the stacking ring 18 a cross-sectional shape resembling an inverted U.

An elongated, generally rectangular metallic reinforcing insert 30 is positioned within the channel 20, with the upper edge surface 32 of the insert engaging the web 28 within channel 20. Preferably, insert 30 extends downwardly to a point substantially adjacent to or slightly below the bottom of the flanges 24, 26 to thereby form at least a portion of the bearing surface for supporting the crate.

Figure 3:
FIG. 3 is a sectional view taken on line 3—3 of FIG. 1.

A plurality of openings 34 are formed in web 28 from the bottom portion of channel 20, with the openings 28 extending upwardly through the top of the web 28. Preferably, these openings 34 are formed by removing segments of the web 28 to form notches 36 extending transversely of the webs 24, 26 at spaced intervals along the stacking ring at each side edge of the crate 10. These notches 36 are of sufficient depth to extend slightly below the top portion of channel 20 so that the upper edge surface 32 of the respective reinforcing inserts 30 project into the notches a short distance as can be seen in FIG. 3.

The side panels 16 of body portion 14 each include a plurality of vertically extending rod elements 40 rigidly connected by horizontally extending upper and lower rod elements 42, 44, respectively. Selected ones of the vertically extending rod elements 40 have their lower ends bent inwardly to form lug elements 46. These lug elements 46 are spaced at intervals corresponding to the spacing of the notches 36, and the lugs are of sufficient length to overlay the top surface of the webs 24, 26 to support the wire frame body portion on the molded plastic bottom panel 12. These lugs 46 are each resistance welded, as at 48, to the top surface 32 of metallic insert 30, through the openings 34 to rigidly assemble the bottom panel portion and the upwardly extending body portion together to define a rectangular material handling crate.

Figure 2:
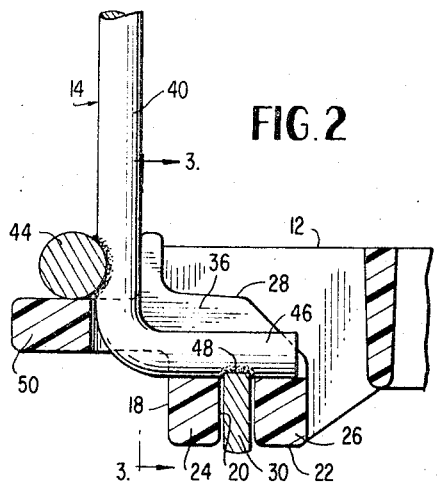
FIG. 2 is a fragmentary sectional view taken on line 2—2 of FIG. 1.

Referring particularly to FIG. 2, the bottom panel 12 is formed with a peripheral flange 50 projecting outwardly past the vertical rod elements 40, and the horizontal rod element 44 is positioned to rest firmly on the top surface of flange 50 when the lugs 46 are welded to the metallic insert 30. Thus, any vertical crushing loads applied to the body portion of the crate, as by stacking a number of other filled crates on top thereof, will result in the rod element 44 transmitting a portion of the load through the web 50 to the stacking ring to thereby avoid the application of very high concentrated loads to the flanges 24, 26 at the lugs 46. Further, this flange 50 acts as a "bumper" or guard to protect the welded joints 48 from lateral impact loads. Since the metallic insert 30 extends substantially the full length of each side of the crate, any vertical lifting loads applied to the body portion of the crate will be transmitted substantially uniformly around the entire periphery of the bottom panel.

Figure 5:
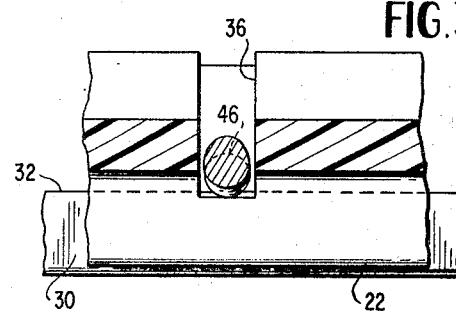
FIG. 5 is a perspective fragmentary sectional view illustrating an alternate embodiment of the invention.
Figure 4:
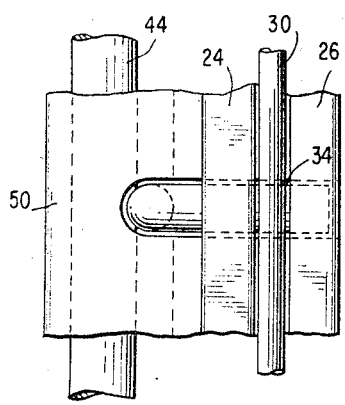
FIG. 4 is a bottom plan view of the structure shown in FIG. 2.

Referring now to FIG. 5, an alternate embodiment of the invention is illustrated as including an upwardly extending body portion 114 having molded plastic side panels 116 with a stacking ring 118 integrally molded thereon and extending around the inner periphery of the crate. An upwardly directed channel 120 is formed in the bottom surface of the stacking ring to divide the ring into spaced parallel flanges 124, 126 integrally joined at their top by a web 128. An elongated metallic reinforcing insert 130 is disposed within the channel 120, and a plurality of notches 136 are formed in the web 128 in the same manner, and for the same purpose described herein above with reference to notches 36.

The bottom of the crate comprises a metallic rod grid structure 112, with horizontally extending lug portions 146 integrally formed on selected ones of the rod elements of the bottom panel to secure the panel to the body portion by welding the lugs 146 to the metallic insert 130. Thus, the structural arrangement for securing together the body and bottom portions of the embodiment illustrated in FIG. 5 is quite similar to that illustrated in FIGS. 1 through 4.

While I have disclosed and described preferred embodiments of my invention, I wish it understood that I do not intend to be restricted solely thereto, but that I do intend to include all embodiments thereof which would be apparent to one skilled in the art and which come within the spirit and scope of my invention.

What is claimed is:

1. In a material handling crate including a bottom panel portion, a separately formed upwardly extending body portion, and means rigidly securing said portions together at spaced points adjacent the outer periphery of said bottom panel, the improvement wherein one of said portions is molded from a plastic material and the other being formed from a plurality of elongated rod-like metal members rigidly secured in fixed relation, and wherein said means rigidly securing said portions together comprises a plurality of apertures formed in said one portion adjacent the outer periphery of said bottom panel portion, elongated metal bar means extending beneath said apertures and in engagemnet with said one portion, and welding lug means positioned within said apertures and rigidly connecting said elongated metal bar means and said other portion, said welding lug means and said elongated metal bar means cooperating to rigidly secure said bottom panel portion and said body portion.

2. In a material handling crate according to claim 1, the further improvement wherein said other of said portion includes means engaging an upwardly directed surface of said one portion.

3. In a material handling crate according to claim 2, the further improvement comprising an upwardly directed channel formed in said one portion, said apertures extending through said one portion from spaced points within said channel and said elongated metal bar means being positioned within said channel.

4. In a material handling crate according to claim 3, the further improvement comprising a stacking ring integrally molded with said one portion and projecting downwardly from said bottom panel adjacent the outer periphery thereof.

5. In a material handling crate according to claim 1, the further improvement wherein said welding lugs are integrally formed with one of said rigidly connected members.

6. In a material handling crate having a bottom panel portion and an upwardly extending body portion, one of said portions being molded from a plastic material and the other of said portions being formed from a plurality of elongated rod-like metal members rigidly secured in fixed relation, said one portion including a stacking ring integrally formed therewith and projecting downwardly from said bottom panel portion adjacent the outer periphery thereof, an upwardly extending channel formed in the bottom surface of said one portion adjacent the outer periphery thereof, an elongated metallic insert positioned in said channel, means defining a plurality of apertures extending through said one portion from spaced points within said channel, and welding lug means extending through said apertures and rigidly joining said other of said portions to said elongated metallic insert, said welding lug means being integrally formed on one of the joined elements, said lug means and said elongated metallic insert cooperating to rigidly secure said bottom panel portion and said upwardly extending body portion together to define said crate.

7. In a material handling crate having a bottom panel portion and an upwardly extending body portion, one of said portions being molded from a plastic material and the other of said portions being formed from a plurality of elongated rod-like metal members rigidly secured in fixed relation, a stacking ring projecting downwardly from said bottom panel portion adjacent the outer periphery thereof, said stacking ring and said one portion being integrally molded from a single mass of plastic material, an upwardly extending channel formed in the bottom surface of said stacking ring, an elongated metallic insert positioned in said channel, means defining a plurality of apertures extending through said one portion from spaced points within said channel, and lug means on said other of said portion positioned within said apertures and welded to said elongated metallic insert, said lug means, said elongated metallic insert and said stacking ring cooperating to rigidly secure said bottom panel portion and said upwardly extending body portion together to define said crate.

8. The material handling crate defined in claim 7 wherein said bottom panel portion is generally rectangular in shape, and said upwardly extending body portion comprises four upwardly extending side panels joined along their side edges to define a crate having a substantially rectangular transverse cross-sectional shape.

9. The material handling crate defined in claim 8 wherein said stacking ring extends in substantially parallel relation to each side edge of said crate adjacent the outer periphery of said bottom panel portion, and said metallic insert extends substantially the full length of said stacking ring along each side edge of said crate.

10. The material handling crate defined in claim 9 wherein said elongated metallic insert forms at least a portion of the bottom bearing surface of said stacking ring to support said crate on a supporting surface.

11. The material handling crate defined in claim 7 wherein said lug means comprises extensions of at least a portion of said plurality of elongated rod-like metal members employed to form said other of said portions.

12. The material handling crate defined in claim 11 wherein said upwardly extending channel formed in said stacking ring extends substantially the full length of said ring to divide said ring into a pair of substantially parallel rails integrally joined at their upper edges, and said lug means extend substantially transverse to and overlie said rails within said apertures.

13. The material handling crate defined in claim 7 wherein said stacking ring is integrally molded with said bottom panel.

14. The material handling crate defined in claim 13 further comprising an integrally molded flange on said bottom panel and extending outwardly therefrom around the outer periphery thereof, and means on said body portion engaging said flange to transmit loads between said body portion and said bottom panel.

15. The material handling crate defined in claim 14 wherein said flange projects laterally outwardly from said bottom panel beyond said body portion.

16. The material handling crate defined in claim 2 wherein said upwardly extending body portion comprises integrally molded plastic side panels extending upwardly from said bottom panel portion and joined at the corners of the crate, said stacking ring being integrally molded with said side panels.

References Cited
UNITED STATES PATENTS

| | | | |
|---|---|---|---|
| 2,850,204 | 8/1958 | Rehrig | 217—19 X |
| 3,250,430 | 5/1966 | Ceila | 220—73 |
| 3,351,228 | 11/1967 | Huisman | 220—66 |

GEORGE E. LOWRANCE, *Primary Examiner.*

U.S. Cl. X.R.

220—66